(12) United States Patent
Damiani

(10) Patent No.: US 11,862,030 B2
(45) Date of Patent: Jan. 2, 2024

(54) METHOD AND SYSTEM FOR DETECTING OBSTACLES WITH AN OBSTACLE SENSOR FOR AN AIRCRAFT

(71) Applicant: AIRBUS HELICOPTERS, Marignane (FR)

(72) Inventor: Nicolas Damiani, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 164 days.

(21) Appl. No.: 17/528,895

(22) Filed: Nov. 17, 2021

(65) Prior Publication Data
US 2022/0172631 A1    Jun. 2, 2022

(30) Foreign Application Priority Data

Dec. 2, 2020    (FR) ...................................... 2012540

(51) Int. Cl.
*G08G 5/04*    (2006.01)
*B64D 43/00*    (2006.01)

(52) U.S. Cl.
CPC ............. *G08G 5/045* (2013.01); *B64D 43/00* (2013.01)

(58) Field of Classification Search
None
See application file for complete search history.

(56) References Cited

U.S. PATENT DOCUMENTS

| | | | | |
|---|---|---|---|---|
| 6,804,607 B1* | 10/2004 | Wood | .................. | G05D 1/1062 340/425.5 |
| 9,568,602 B1* | 2/2017 | Stadelmann | ............. | G01S 7/03 |
| 9,685,092 B2* | 6/2017 | Kurgan | ................ | G08G 5/0013 |
| 9,824,598 B2* | 11/2017 | Onomura | ............. | G08G 5/0008 |
| 9,983,762 B2* | 5/2018 | Le Pors | ............. | G06F 3/04845 |
| 9,997,078 B2* | 6/2018 | Gadgil | ................ | G08G 5/0052 |
| 10,403,158 B2* | 9/2019 | Lieberman | ............. | G08G 5/045 |
| 10,451,422 B2* | 10/2019 | Royster | ................ | G08G 5/0021 |
| 10,484,667 B2* | 11/2019 | Shintani | .................... | G06T 7/55 |
| 10,571,559 B2* | 2/2020 | Murakowski | ......... | G01S 13/935 |
| 10,627,516 B2* | 4/2020 | Eichenholz | .......... | G02B 26/105 |
| 10,783,795 B2* | 9/2020 | Smith | .................... | G08G 5/025 |
| 10,803,760 B2* | 10/2020 | Veronesi | ............. | G08G 5/0013 |

(Continued)

FOREIGN PATENT DOCUMENTS

| | | | | |
|---|---|---|---|---|
| EP | 2138864 A1 | | 12/2009 | |
| EP | 2672289 A1 | * | 12/2013 | ............. G01C 23/00 |

(Continued)

OTHER PUBLICATIONS

French Search Report for French Application No. FR2012540, Completed by the French Patent Office, dated Jul. 13, 2021, 9 pages.

*Primary Examiner* — Fekadeselassie Girma
(74) *Attorney, Agent, or Firm* — BROOKS KUSHMAN P.C.

(57) ABSTRACT

A method for detecting obstacles in the vicinity of an aircraft. The method comprises the following steps: examining a surrounding space by means of an obstacle sensor, the obstacle sensor generating positioning data relating to a plurality of obstacle points; determining, from among the obstacle points, each relevant point situated within a predetermined detection volume, the detection volume being different from the surrounding space; and displaying the relevant points on a display.

20 Claims, 4 Drawing Sheets

(56) References Cited

U.S. PATENT DOCUMENTS

| | | | |
|---|---|---|---|
| 10,845,823 B2* | 11/2020 | Burghardt | G05D 1/0825 |
| 10,883,826 B2* | 1/2021 | Liu | G01C 21/3826 |
| 10,909,875 B2* | 2/2021 | Nadeau Beaulieu | G09B 9/085 |
| 10,964,221 B2* | 3/2021 | Vana | G01S 17/89 |
| 10,983,534 B2* | 4/2021 | English | B64C 27/54 |
| 11,022,681 B2* | 6/2021 | Caporizzo | G01S 7/497 |
| 2004/0141170 A1* | 7/2004 | Jamieson | G01S 17/89 356/612 |
| 2012/0123671 A1* | 5/2012 | Oberti | G01S 13/935 701/301 |
| 2012/0158219 A1* | 6/2012 | Durling | G08G 5/045 701/4 |
| 2013/0128258 A1* | 5/2013 | Glad | G01S 7/003 356/4.01 |
| 2013/0265185 A1* | 10/2013 | Kreitmair-Steck | G01S 13/933 342/29 |
| 2013/0282208 A1* | 10/2013 | Mendez-Rodriguez | G01S 17/933 701/16 |
| 2013/0332062 A1* | 12/2013 | Kreitmair-Steck | G01S 7/062 701/301 |
| 2014/0292556 A1* | 10/2014 | Kreitmair-Steck | G01S 13/935 342/29 |
| 2015/0193101 A1* | 7/2015 | Mannon | G08G 5/065 715/771 |
| 2015/0194060 A1* | 7/2015 | Mannon | G06F 3/0481 715/771 |
| 2016/0335898 A1* | 11/2016 | Caplan | G08G 5/045 |

FOREIGN PATENT DOCUMENTS

| | | | | |
|---|---|---|---|---|
| EP | 2891900 A1 * | 7/2015 | | G01S 13/931 |
| EP | 3163318 A1 | 5/2017 | | |
| EP | 3236213 A2 * | 10/2017 | | B64D 43/00 |
| EP | 3236213 A2 | 10/2017 | | |
| EP | 3236213 A3 | 12/2017 | | |
| FR | 2932279 A1 * | 12/2009 | | G01S 13/94 |

* cited by examiner

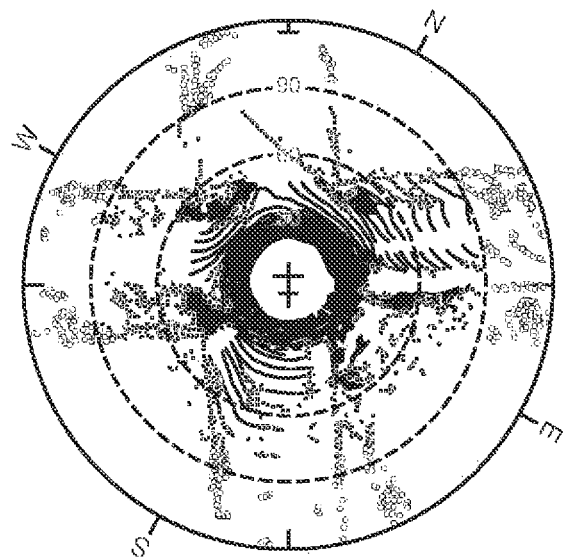
Fig.7
Fig.8
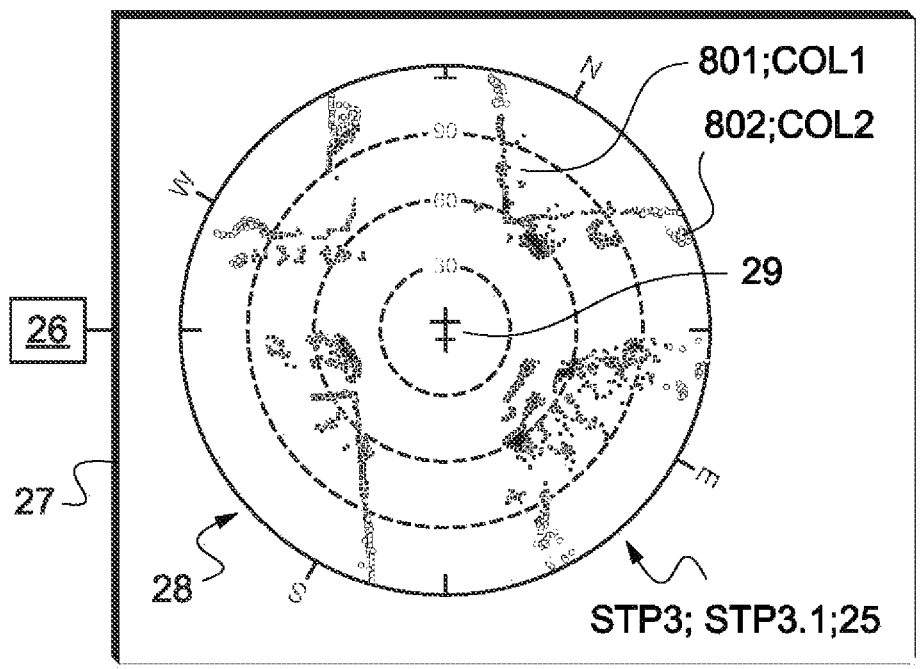

METHOD AND SYSTEM FOR DETECTING OBSTACLES WITH AN OBSTACLE SENSOR FOR AN AIRCRAFT

CROSS REFERENCE TO RELATED APPLICATIONS

This application claims the benefit of FR 20 12540 filed on Dec. 2, 2020, the disclosure of which is incorporated in its entirety by reference herein.

TECHNICAL FIELD

The present disclosure relates to a method and a system for detecting obstacles with an obstacle sensor for an aircraft.

BACKGROUND

An aircraft may include an obstacle detection system. Such an obstacle detection system may include an obstacle sensor and a display showing the detected obstacles. For example, the obstacle sensor may comprise an obstacle sensing device of the type known by the acronym LiDAR (Light Detection And Ranging).

A LiDAR obstacle sensing device can scan the surrounding space in elevation in an angular field and in azimuth. Each detected point of an obstacle can be identified by its position relative to the obstacle sensing device. Such a point may be referred to for convenience as an "obstacle point". Therefore, each obstacle point can be identified by the distance separating it from the obstacle sensing device and by a bearing angle and an angle of elevation relative to the obstacle sensor. An obstacle detection system may include a satellite positioning device and a memory for identifying obstacle points in a local reference frame of the aircraft.

Previous-generation LiDAR obstacle sensing devices allow the surrounding space to be scanned only over 120 degrees in azimuth, over a limited angular field in elevation of plus or minus 3 degrees, and over a limited distance of less than 100 meters. Given the limited performances of such an obstacle sensing device, an obstacle detection system may comprise several obstacle sensing devices for scanning the space around an airframe of the aircraft, which may have an impact on the mass of the aircraft. Furthermore, when the aircraft's attitude is modified by a rolling or pitching motion, there is a risk of the beam of the LiDAR obstacle sensing device no longer coming into contact with an obstacle situated in the vicinity of the aircraft. By way of example, and owing to the limited angular field scanned by such an obstacle sensing device, when the aircraft has a relatively significant roll attitude, this scanned angular field may pass above a nearby pylon. The pylon is therefore not detected.

However, other LiDAR obstacle sensing devices perform better. For example, a modern LiDAR obstacle sensing device can detect obstacles at a distance of approximately 200 meters, vertically in an angular field of plus or minus 22.5 degrees relative to a median position, and in azimuth through 360 degrees around the aircraft. Such a LiDAR obstacle sensing device can therefore acquire approximately 3 million obstacle points per second, for example.

The use of such a high-performance LiDAR obstacle sensing device may be advantageous, for example in order to use a single obstacle sensing device instead of a system having several lower-performance obstacle sensing devices. Nevertheless, such a high-performance LiDAR obstacle sensing device may surprisingly prove problematic by detecting a very high number of points belonging to obstacles, in particular close to the relief. In particular, the high-performance LiDAR obstacle sensing device can detect points belonging to obstacles that do not present a real danger in the short term. Consequently, the obstacle detection system may have difficulties rapidly processing all of the detected obstacle points. In addition, the display of the obstacle detection system may display a representation of many obstacle points. It may be difficult for a pilot examining a display displaying many obstacle points to analyze the displayed data objectively and quickly, alongside the other tasks that need to be performed.

Document EP 3 236 213 describes a display system receiving data from a plurality of sensors in order to display a three-dimensional illustration of a region surrounding an aircraft. Each danger is displayed in a color corresponding to its priority. Document EP 3 236 213 mentions the possibility of adjusting the power of the sensors.

Document EP 3 163 318 describes an obstacle detection system that is provided with a display and a processor. The processor receives data from sensors that are configured to detect obstacles around the aircraft. The processor generates display data by sector and for a plurality of blocks within the sectors.

Document US2013/0332062 A1 describes an obstacle detection system that is provided with a display and a processor.

Documents US 2013/0282208 A1 and EP 2 138 864 A1 are also known.

SUMMARY

An object of the present disclosure is therefore to propose a method for detecting obstacles that offers a high level of performance and makes the measured data intelligible.

The disclosure therefore relates to a method for detecting obstacles in the vicinity of an aircraft. This method comprises the following steps:

examining a surrounding space by means of an obstacle sensor, said obstacle sensor generating positioning data relating to a plurality of obstacle points;

determining each obstacle point situated within a detection volume, each obstacle point situated within said detection volume being a relevant point, the detection volume being different from said examined surrounding space, at least one volume of the examined space being located outside the detection volume at any point in time; and displaying said relevant points on a display.

The method therefore makes it possible to use an obstacle sensor comprising, for example, a high-performance, modern LiDAR. As indicated above, the performances of such a LiDAR can be a source of difficulties.

The positioning data are obtained in a conventional manner and comprise, for example, a distance, an angle of elevation and/or a bearing angle relative to the aircraft.

The expression "surrounding space" denotes the space examined by the obstacle sensor.

The expression "obstacle point" denotes a point of an obstacle detected by the obstacle sensor.

The expression "determining each obstacle point situated within a predetermined detection volume, each obstacle point situated within said detection volume being a relevant point" means that each point detected by the obstacle sensor that is in the surrounding space and at the same time in the detection volume is a relevant point. Obstacle points situated outside this detection volume are referred to, in contrast, for convenience, as "irrelevant points".

According to this method, the obstacle points are filtered in order to display the relevant points. The irrelevant points are not displayed on the display. For example, a tree or the ground may lie within in the field examined by the obstacle sensor, while the aircraft is situated very far above the ground or this tree. The ground or this tree does not, for example, constitute an immediate danger, and is not located in the detection volume. Therefore, the obstacle points of the ground or of this tree will be irrelevant. The ground or the tree will be eliminated from the display given to the pilot.

Thus, the method makes it possible to filter the measurements of the obstacle sensor, such that, during a display step, only the measurements relating to objects likely to represent a real danger are used, these objects being present in the predetermined detection volume corresponding to a safety and monitoring volume around the aircraft.

The method may be applied using an extremely simple and thus reliable and easily certifiable filter, unlike complex processing systems that aim to identify particular objects in a point cloud, for example.

Such a method may also optionally be applied to certain existing aircraft.

The method may further comprise one or more of the following features, taken individually or in combination.

According to one possibility, the surrounding space examined by the obstacle sensor comprises an examined volume that may extend through 360 degrees about an axis of symmetry attached to the aircraft, said surrounding space extending in elevation in an angular field extending to either side of a median plane orthogonal to said axis of symmetry.

The obstacle sensor can thus scan a substantially annular space that surrounds the aircraft and is symmetrical with respect to the axis of symmetry. Optionally, the obstacle sensor may comprise a single obstacle sensing device, for example of the LiDAR type. The axis of symmetry can then pass through this obstacle sensing device. In particular, the obstacle sensing device may be able to rotate about the axis of symmetry.

The examined space may correspond, at any point in time, to the examined volume, except for the examining frequency of the obstacle sensing device.

Alternatively, the examined space may comprise each examined volume analyzed since a measurement time, i.e., calculated or predefined or indeed stored.

A detector of the obstacle sensor may apply an algorithm upstream of the filter in order to store the measurements made by the obstacle sensing device or devices over a period referred to, for convenience, as the "measurement time". Said algorithm can aggregate the measurements, the examined space resulting from the aggregation of all the volumes examined during this period and repositioned in relation to one another in a single reference frame. The result of this aggregation has the advantage of covering an examined space that is much denser and more extensive than that which the obstacle sensing device can acquire at a given point in time. The filter that makes it possible to eliminate the detections that do not present a real danger is therefore even more decisive, with respect to this aggregation result, in terms of the result that will be presented.

The measurement time may be at least 2 minutes, or may correspond to the time that has elapsed since the aircraft was switched on, take-off, i.e., the moment when the landing gear or landing gears left the ground, a particular point of a take-off procedure was reached, etc.

By way of example, the examined space comprises all the volumes examined over a period of two minutes. The algorithm thus stores all the detections obtained over the past two minutes and repositions them among themselves, and the detected obstacle points are then transmitted to the filter, which retains for display only the relevant points presenting a real danger.

Combining this type of algorithm with the filter can make it possible, at a given point in time, to consider an obstacle that is not inside the volume examined by the obstacle sensing device at this given point in time. According to an example given by way of illustration, an aircraft may fly forwards and the measurement time may be two minutes. At a current point in time, an obstacle situated below the aircraft cannot be detected by the obstacle sensing device. However, one minute earlier, this obstacle was situated in front of the aircraft and could be detected by the obstacle sensing device. At the current point in time, the obstacle points corresponding to this obstacle therefore continue to be processed by the filter and are analyzed in order to be classified as being relevant or irrelevant points.

Optionally, the measurement time in question may be a constant or may vary depending on the speed of movement of the aircraft. For example, when the speed of movement is less than a relatively low predetermined threshold speed, for example of the order of 20 knots (about 37 kilometers per hour/23 miles per hour), and at most over the entire time period during which the speed of movement is lower than this threshold speed, the measurement time in question can be calculated by means of a linear function giving the measurement time as a function of the inverse of the speed of movement of the aircraft. Consequently, if the position of the aircraft is virtually stationary, this definition of the measurement time means that the system will display relevant obstacle points even if they have no longer been in the examining field of the sensor for a time period close to the time period during which quasi-hovering flight has been taking place.

According to a possibility compatible with the preceding possibility, the angle of said angular field may be at least 40 degrees.

For example, the obstacle sensor may include a "wide-angle" LiDAR obstacle sensing device.

According to a possibility compatible with the preceding possibilities, said display step may comprise a step of displaying said relevant points in a two-dimensional representation seen from above or below the aircraft, advantageously seen from above, and through 360 degrees around a symbol representing the aircraft.

The obstacle sensor can detect a very large number of obstacle points per second, for example of the order of several million obstacle points. Such a density of obstacle points may make it possible to produce a three-dimensional representation of the aircraft's surroundings. The preceding feature runs counter to the prejudice of thinking that such a representation is optimal. Indeed, a three-dimensional representation is dependent on the visual interpretation made of it by the pilot. During a phase of flight involving a heavy workload, a pilot may have difficulty effectively and quickly grasping his or her position and perceiving the distance separating him or her from the obstacles by consulting such a display.

The above feature proposes a simpler display representing, in a two-dimensional top or bottom view, the relevant points around a symbol representing the aircraft. Such a display, in synergy with a relevant filtering of the obstacle points, can help the crew to quickly grasp the direction and the distance of the dangerous obstacles that surround the aircraft.

Alternatively, a three-dimensional display filtered according to the same principle remains possible.

According to a possibility compatible with the preceding possibilities, said detection volume may be attached to the aircraft, said detection volume defining a volume in which an obstacle is likely to present a danger to the aircraft.

The expression "said detection volume may be attached to the aircraft" means that the detection volume is positioned relative to an origin of the aircraft. For example, this origin may be a position of an obstacle sensing device of the obstacle sensor. For example, this origin may be the center of gravity of a LiDAR. The detection volume moves together with the movement of the aircraft.

Furthermore, the detection volume extends above a low plane, and advantageously between, and inclusive of, a high plane and a low plane, the high plane and the low plane being situated vertically, i.e., along a vertical axis, respectively above and below the aircraft.

The high plane and the low plane delimit, in elevation, a strip of airspace in which both the aircraft and the obstacles likely to be dangerous are situated.

The high plane and the low plane can be parallel.

For example, the aircraft may be a rotorcraft that includes an airframe that extends upwards from one or more landing gears to a rotor. The positions of the high plane and of the low plane are then determined, for example, with regard to any obstacle that could collide with the rotor or with the landing gear or gears.

According to one possibility compatible with the preceding possibilities, the method may include a step of determining a maximum threshold height and a minimum threshold height. Said maximum threshold height is a distance separating said high plane and a reference of the aircraft in the vertical direction, said minimum threshold height being a distance separating said reference and said low plane in the vertical direction.

The effect of this technical feature is to position the low plane and the high plane in an appropriate manner in order to identify relevant points that are actually dangerous.

The high plane and the low plane are positioned with respect to a reference of the aircraft by determining a maximum threshold height and a minimum threshold height. The maximum threshold height and/or the minimum threshold height can be stored or calculated. For example, this reference may be a position of an obstacle sensing device of the obstacle sensor. For example, the reference may be the center of gravity of a LiDAR.

Using the obstacle sensing device of the obstacle sensor as a reference may have the advantage of facilitating the positioning of the identified obstacle points with respect to the high plane and the low plane. Specifically, the obstacle points can be positioned relatively easily with respect to this obstacle sensing device.

According to one possibility compatible with the preceding possibilities, the method may in particular include determining an obstacle height of each obstacle point with respect to a reference plane passing through said reference, each relevant point having, relative to the reference plane, an obstacle height placing it between the high plane and the low plane. The reference plane may be parallel to the high plane and/or the low plane.

The obstacle height may be the shortest distance between the reference plane and the obstacle point in question.

For example, each obstacle height is, by convention, positive for any object placed above the reference plane and negative for any object situated below the reference plane, in which the terms "above" and "below" are to be considered with respect to a terrestrial reference frame and, for example, as seen by an observer on the ground. Thus, the minimum threshold height is negative and the maximum threshold height is positive. In addition, a relevant point has an obstacle height comprised between and inclusive of the minimum threshold height and the maximum threshold height, for example and depending on the variant.

According to one possibility compatible with the preceding possibilities, the obstacle height of a said obstacle point may depend on the distance of the obstacle point from the reference and an angle of elevation of said obstacle point relative to the reference and a bearing angle of the obstacle point relative to the reference.

These three variables may be determined in a conventional manner by an obstacle sensing device and, in particular, a LiDAR. Each obstacle point may thus be characterized by a distance Dn of between 0 and the maximum detection distance of the obstacle sensor, an angle of elevation of between −25 degrees and +25 degrees, for example, relative to a median plane corresponding to the middle of the scanned field, and a bearing angle of between 0 degrees and 360 degrees in which, for example, a bearing angle of 0 degrees corresponds to the position of the nose of the aircraft and the bearing angle of 180 degrees corresponds to the tail of the aircraft.

A roll angle and a pitch angle of the aircraft, measured in a conventional manner, for example by an inertial unit or inclinometers, may also be taken into account in order to dynamically maintain the detection volume relative to the terrestrial environment.

For example, said obstacle height of a said obstacle point is calculated using the following relation:

$$Hn = Dn * \sin(alphan + (phi * \sin(p\ sin)) + theta * \cos(p\ sin))$$

where "Hn" represents the obstacle height, "=" represents the equals sign, "*" represents the multiplication sign, "+" represents the addition sign, "sin" represents the sine function, "cos" represents the cosine function, "Dn" represents the distance of the obstacle point from the reference, obtained by means of the obstacle sensor, "alphan" represents the angle of elevation of the obstacle point, obtained by means of the obstacle sensor, "p sin" represents the bearing angle of the obstacle point, obtained by means of the obstacle sensor, "phi" represents the roll angle of the aircraft, "theta" represents the pitch angle of the aircraft.

According to one possibility compatible with the preceding possibilities, said maximum threshold height may be equal in absolute value to the distance separating a top of the aircraft from the reference plus a first safety margin in an upward direction, said minimum threshold height being equal in absolute value to a distance of one end of a landing gear from the reference plus a second safety margin in a downward direction.

According to one possibility compatible with the preceding possibilities, said maximum threshold height and said minimum threshold height may be variable depending on at least one of the following parameters: a vertical speed of the aircraft, a height of the aircraft relative to the ground, a forward speed of the aircraft.

According to the preceding example, the first margin and the second margin may, for example, be variable depending on this vertical speed and/or a height relative to the ground and/or a forward speed, namely an air speed or the like. For example, the first margin and the second margin may decrease when the vertical speed decreases.

According to a first variant concerning the positioning of the high and low planes, said high plane and said low plane are horizontal.

In a second variant concerning the positioning of the high and low planes, said high plane and said low plane are parallel to a surface of a landing area. For example, the system comprises an adjustment interface making it possible to configure the inclination of such a surface and, for example, the reference plane mentioned above. The low and high planes are then made parallel to this surface of the landing area by offsetting them from the reference plane by the minimum threshold height and the maximum threshold height respectively, for example.

According to a third variant concerning the positioning of the high and low planes, said high plane and the low plane are parallel to a plane defined by a longitudinal speed vector and a lateral speed vector of the aircraft.

The variants may be cumulative, an individual being able to choose one of the variants by means of a selection interface, for example. According to another example, the variant to be used is chosen automatically by a filter depending on the flight phase, for example using the third variant at speeds higher than a predetermined air speed, the first variant at speeds lower than this predetermined air speed and heights above a predetermined height, then the second variant at speeds lower than this predetermined air speed and heights lower than the predetermined height.

According to one possibility compatible with the preceding possibilities, the method may include a step of storing said obstacle points in a buffer memory.

Obstacle points may be stored in a memory for the duration of the mission, for example.

According to one possibility compatible with the preceding possibilities, the method may include a step of colorizing each relevant point depending on the nature of the material of an obstacle detected at this relevant point, this nature possibly relating to the mineral group or the metal group or the organic material group or the group of elements diffused in the air.

A LiDAR obstacle sensing device can make it possible to characterize the nature of the illuminated objects in a conventional manner, depending on the wave train return signal. Thus, the display can, for example, use a first color to represent a mineral element (soil, stone, etc.), a second color to represent a metal element (cable, pylon, etc.), a third color to represent an organic element (foliage, branch, etc.) and a fourth color to represent a diffuse element (cloud, dust, rain, etc.).

In addition to a method, the disclosure relates to an aircraft provided with an obstacle detection system, said obstacle detection system comprising an obstacle sensor and a display.

The obstacle detection system may implement the method of the disclosure, said obstacle detection system having a filter configured to determine, from among said obstacle points, each relevant point situated within a predetermined detection volume, the detection volume being different from said surrounding space, said display being configured to display said relevant points.

The obstacle sensor may comprise one or more obstacle sensing devices returning distance information, for example of the LiDAR type. The obstacle sensor may comprise a detector, for example a computer, for aggregating the measurements taken by the obstacle sensing device or devices and transmitting them to the filter.

Optionally, said display may be a two-dimensional display.

Optionally, said aircraft may comprise a measurement system measuring a roll angle and a pitch angle of said aircraft, said filter cooperating with said measurement system.

BRIEF DESCRIPTION OF THE DRAWINGS

The disclosure and its advantages appear in greater detail in the context of the following description of embodiments given by way of illustration and with reference to the accompanying figures, in which:

FIG. 7 is a view of a display not corresponding to the disclosure displaying the unfiltered obstacle points detected by the aircraft of FIG. 6, said view helping illustrate an advantage of the disclosure; and FIG. 8 is a view of a display according to the disclosure displaying the filtered obstacle points detected by the aircraft of FIG. 6.

DETAILED DESCRIPTION

Elements that are present in more than one of the figures are given the same references in each of them, unless otherwise indicated.

The terms "low", "high", "top", "bottom", "above", "below", "vertical", "horizontal" or the like used hereinafter are to be considered as seen by an observer on the ground, and when the aircraft is not in an upside-down position, i.e., when the aircraft is hovering, for example, or is not performing a loop manoeuvre, for example.

Figure 1:
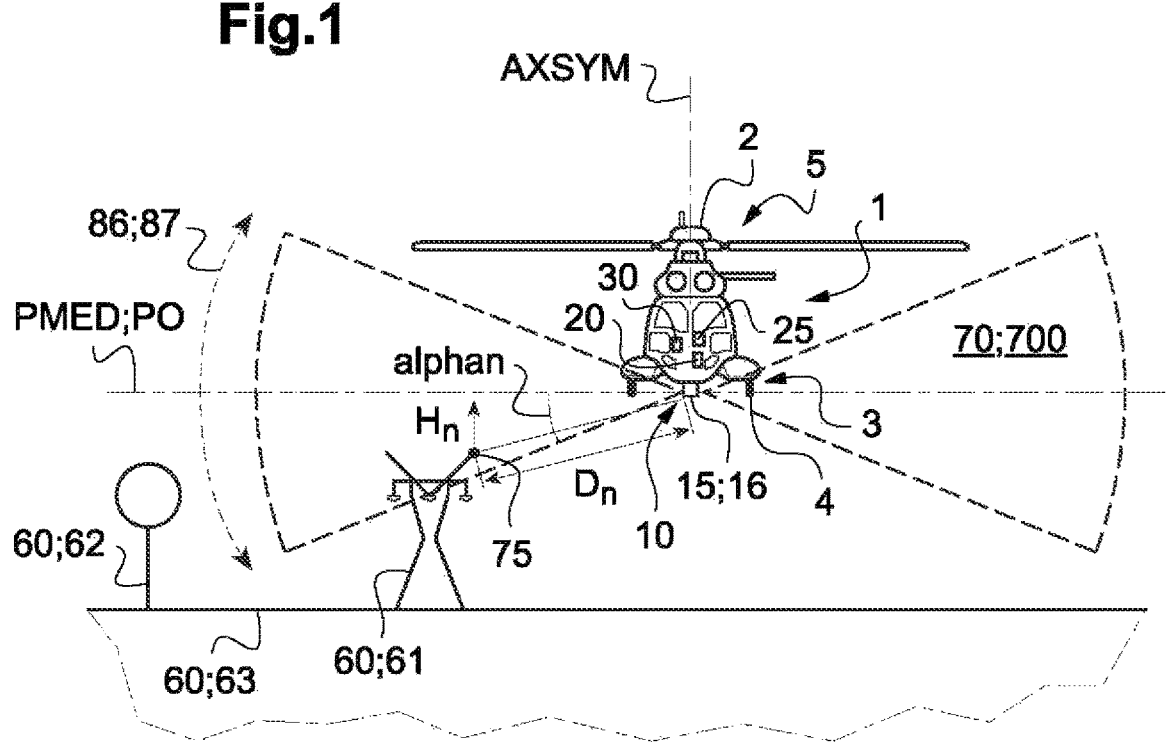
FIG. 1 is a front view of an aircraft according to the disclosure.

FIG. 1 shows an aircraft 1 according to the disclosure. Optionally, and not exclusively, this aircraft 1 may be a rotorcraft comprising a rotor 5.

Irrespective of this aspect, the aircraft 1 may include an airframe that extends upwards from a bottom end, referred to more simply as the "end 4", to a top 2. According to the example shown, the top 2 may be situated at the rotor 5, in this case at a cap of the rotor 5. According to the example shown, the end 4 may be the point of a landing gear 3 that is closest to the ground, for example when the aircraft 1 is in a stationary position and there is no wind.

Irrespective of these aspects, the aircraft 1 is provided with an obstacle detection system 10.

The obstacle detection system 10 is provided with an obstacle sensor 15. The obstacle sensor 15 is configured to detect one or more obstacles 60 in a surrounding space 70. The obstacles 60 may be of various shapes, for example being part of the relief 63, a tree 62, a pylon 61, another aircraft, a building, etc.

Figure 2:
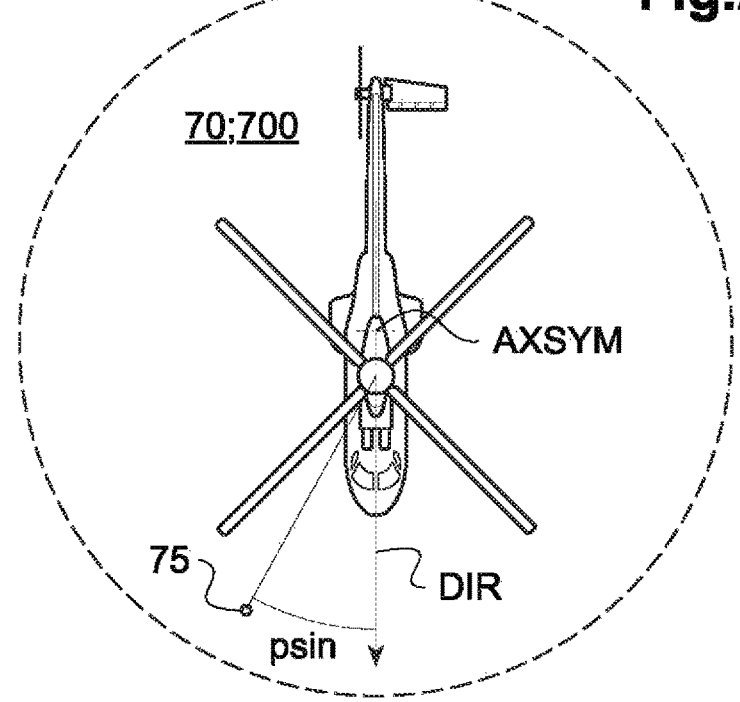
FIG. 2 is a top view of an aircraft according to the disclosure.

In particular, and with reference to FIG. 2, the surrounding space 70 examined and, for example, scanned by the obstacle sensor 15 may comprise an examined volume 700 that extends through 360 degrees about an axis of symmetry AXSYM attached to the aircraft 1. In reference to FIG. 1, the examined volume 700 may extend in elevation and in partial section, i.e., vertically as seen by an observer on the ground 63, in an angular field 86 extending to either side of a median plane PMED that is orthogonal to the axis of symmetry AXSYM. The median plane PMED divides the angular field 86 into two equal parts. In particular, the angular field 86 may extend over an angle 87 of at least 40 degrees and, for example, over 45 degrees according to the example shown.

Figure 3:
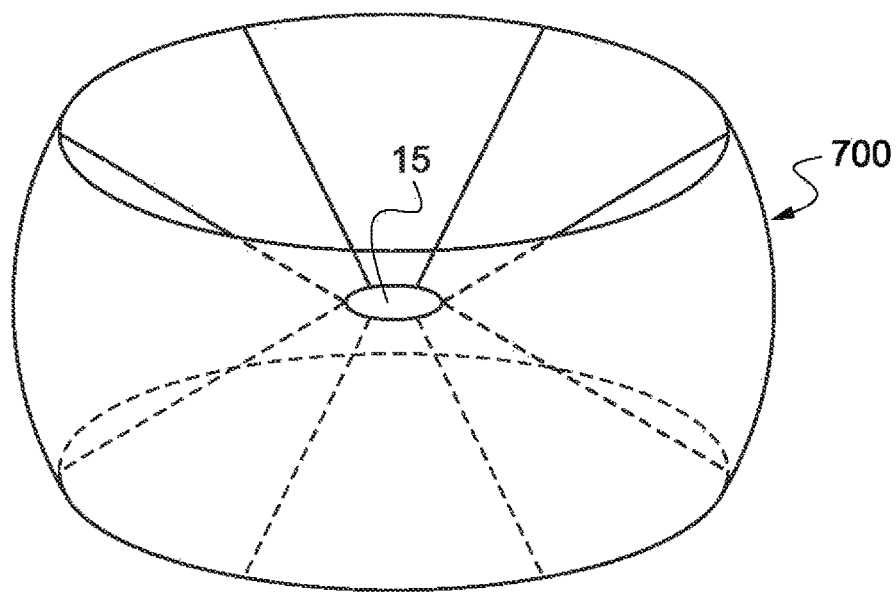
FIG. 3 is a view of a volume examined at a given point in time by an aircraft according to the disclosure.

Therefore, and in reference to FIG. 3, the examined volume 700 may be in the form of a volume obtained by rotating a sector of a disk about the axis of symmetry AXSYM. Such a volume can be examined very quickly, for example at a frequency of the order of 5 Hertz.

The surrounding space 70 may be restricted to this examined volume 700.

Alternatively, the surrounding space 70 may result from the aggregation of all the examined volumes 700 that have been analyzed during a measurement time. This measurement time may be fixed, being stored, or variable, being calculated by the system and possibly by the obstacle sensor described below or a computer that may or may not be dedicated to this application. For example, the measurement time depends on at least one speed of the aircraft, for example depending on the air speed.

The obstacle sensor 15 may comprise one or more obstacle sensing devices 16. For example, an obstacle sensing device 16 emits a signal and receives the signal returned by a point of an obstacle 60, if applicable. This point is referred to as an "obstacle point". For example, an obstacle sensing device 16 may be of the LiDAR type. For example, an obstacle sensing device 16 may be made mobile by a motorized system in order to rotate about an axis and, in particular, said axis of symmetry AXSYM.

According to one possibility, the obstacle sensor 15 may be provided with a single obstacle sensing device 16, for example of the LiDAR type.

According to another aspect, the obstacle sensor 15 emits, in a conventional manner, at least one signal carrying at least one item of positioning data of each detected obstacle point 75. For example, the obstacle sensor 15 determines, for each detected obstacle point 75, the distance of the obstacle point 75 from a reference Ref. This reference Ref may be an obstacle sensing device 16 of the obstacle sensor 15. The obstacle sensor 15 can determine, for each detected obstacle point 75, an angle of elevation alphan relative to the reference Ref, and, for example, relative to the median plane PMED passing through the reference Ref. In reference to FIG. 2, the obstacle sensor 15 can determine, for each detected obstacle point 75, a bearing angle p sin of the obstacle point relative to the reference Ref and, for example, relative to a forward direction DIR passing through this reference Ref.

The obstacle sensor 15 may comprise a detector provided with a memory which stores all the obstacle points obtained by the obstacle sensing device or devices, possibly during a sliding period referred to as the "measurement time". The detector may further comprise an algorithm for positioning all the obstacle points obtained during the measurement time, according to the aforementioned example, relative to the reference Ref and in terms of a distance as well as an angle of elevation and a bearing angle. For example, this algorithm is referred to as a "SLAM" (Simultaneous Localization And Mapping) algorithm. The detector may comprise at least one processor and at least one memory, at least one integrated circuit, at least one programmable system, or at least one logic circuit.

In addition, and in reference once more to FIG. 1, the obstacle detection system 10 includes a filter 20. The filter 20 communicates via a wired or wireless link with the obstacle sensor 15 and, if applicable, with the detector and/or with each obstacle sensing device.

The filter 20 may comprise at least one processor and at least one memory, at least one integrated circuit, at least one programmable system, or at least one logic circuit, these examples not limiting the scope to be given to the term "filter". The term "processor" may refer equally to a central processing unit (CPU), a graphics processing unit (GPU), a digital signal processor (DSP), a microcontroller, etc. The filter 20 may comprise one or more units. Optionally, the detector and the filter may form part of the same computer.

Optionally, the filter 20 may communicate via a wired or wireless link with a measurement system 30 measuring a roll angle and a pitch angle of said aircraft 1. For example, the measurement system 30 may comprise an inclinometer for measuring the roll angle, an inclinometer for measuring the pitch angle or indeed an inertial unit.

According to another aspect, the obstacle detection system 10 includes a display 25. The display 25 may, for example, be a two-dimensional display, i.e., a display displaying information in a two-dimensional representation. The filter 20 and the display 25 may share the same unit, for example. The filter 20 may be a computer of a display device, for example, the display 25 comprising, in particular, a screen of the display device. The filter 20 may comprise a unit shared with the obstacle sensor 15.

The obstacle sensor 15, the filter 20 and the display 25 are in particular configured to apply the method according to the disclosure.

Figure 4:
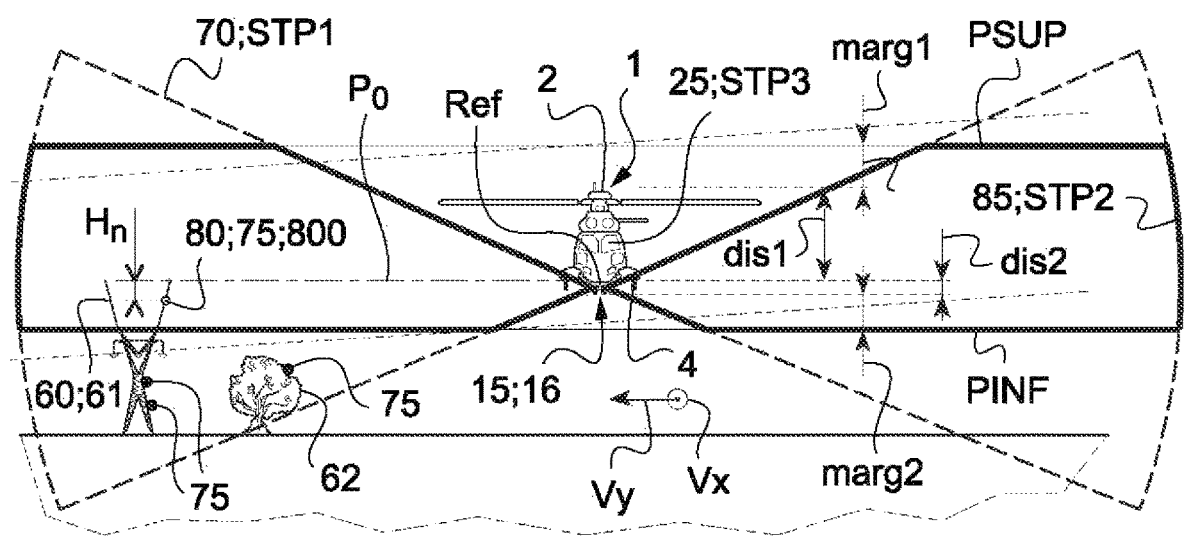
FIG. 4 is a view showing the method of the disclosure when the aircraft is oriented with a zero roll angle.

In reference to FIG. 4, this method comprises examining STP1 a surrounding space 70 by means of the obstacle sensor 15. For example, an obstacle sensing device 16 referred to as a "wide angle" obstacle sensing device is able to rotate about the axis of symmetry AXSYM to detect the obstacles present in the surrounding space to be analyzed. The expression "surrounding space" denotes a volume searched by the obstacle sensor 15. The obstacle sensor 15 examines all the surrounding space that it is able to examine, this surrounding space being fixed and dependent on the sensor and not adjustable.

The obstacle sensor 15 generates, for each detected obstacle point 75, at least one item of positioning data transmitted to the filter 20. Optionally, the filter 20 processes the positioning data emitted during a measurement time.

For example, the obstacle sensor 15 transmits to the filter 20, for each detected obstacle point 75, the distance Dn, the angle of elevation alphan and the bearing angle p sin described above.

Obstacles 60 that pose no danger to the aircraft may be detected because of the large dimensions of the surrounding space 70 that is examined. According to FIG. 4, a tree 62 that poses no danger may be considered to be an obstacle 60.

Figure 5:
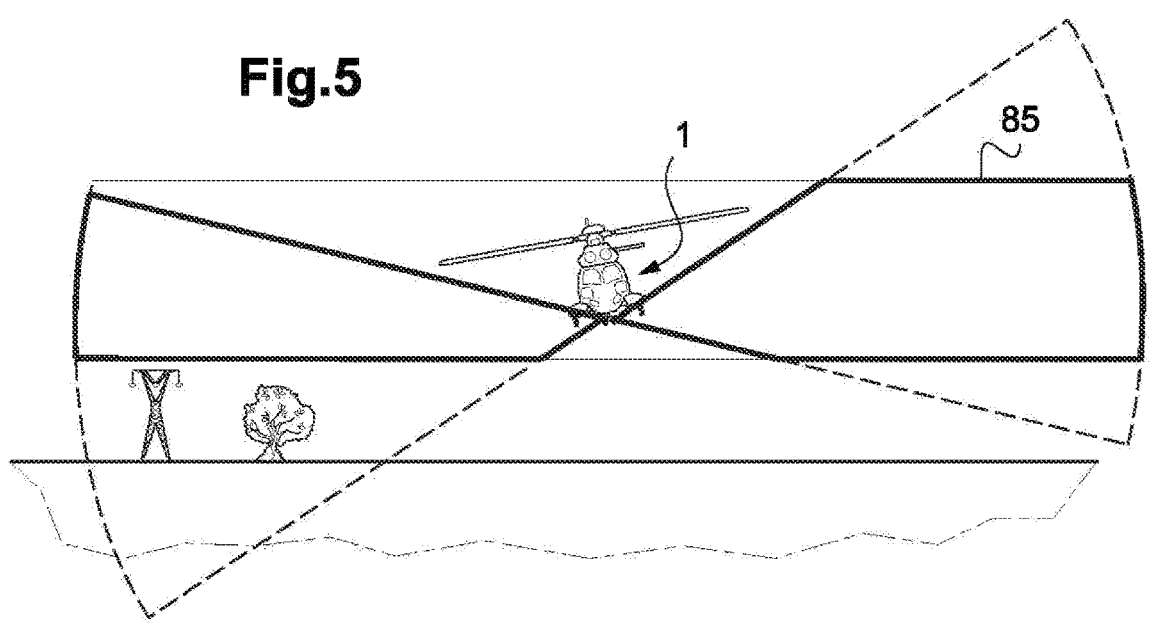
FIG. 5 is a view showing the method of the disclosure when the aircraft is oriented with a non-zero roll angle.

With reference to FIG. 5, the detection of obstacle points 75 relating to obstacles that pose no danger may increase depending on the roll angle or pitch angle of the aircraft 1.

According to the disclosure and with reference once more to FIG. 4, the method then comprises determining STP2, from among all the obstacle points 75 and with the filter 20, each relevant point 80, each obstacle point situated within a predetermined detection volume 85 being a relevant point. This detection volume 85 is different from the surrounding space 70, but the detection volume 85 and the surrounding space 70 comprise a common volume. The detection volume 85 can be attached to the aircraft 1. The detection volume 85 represents a volume in which an obstacle point of an obstacle 60 is liable to present a danger to the aircraft 1.

Therefore, according to the method, the filter 20 selects points referred to as "relevant points" that are considered to be potentially dangerous from among all the identified obstacle points. For example, an obstacle point 800 of the pylon 61 is considered relevant whereas all the obstacle points 75 belonging to the tree 62 are deemed irrelevant.

The method then comprises displaying STP3 said relevant points 80 on the display 25, the obstacle points 75 deemed irrelevant not being displayed.

Thus, the filter 20 is configured to determine whether an obstacle point 75 is a relevant point 80, i.e., a point belonging to the detection volume 85, or conversely an irrelevant point, and the display 25 is configured to display only the obstacle points of the relevant point 80 type, the irrelevant points not being displayed.

According to another aspect, the detection volume 85 may extend above a low plane PINF, or even between, and inclusive of, a high plane PSUP and a low plane PINF. The high plane PSUP and the low plane PINF are optionally parallel or even horizontal. For example, the detection volume is in the form of a strip, covering all the space situated through 360 degrees around the aircraft between the low plane PINF and the high plane PSUP.

The high plane PSUP and the low plane PINF are situated vertically and respectively above and below the aircraft 1, the aircraft thus being positioned in the space situated between the high plane PSUP and the low plane PINF. Thus, the aircraft 1 and obstacles 60 that are potentially dangerous in the short term are situated in a space between the low plane PINF and the high plane PSUP.

The filter 20 may therefore be configured to determine whether or not an obstacle point 75 belongs to the detection volume.

For example, the filter 20 may be configured to determine a maximum threshold height H1 and a minimum threshold height H2.

The maximum threshold height H1 represents a distance separating the reference Ref of the aircraft 1 and a point of the high plane PSUP vertically, i.e., according to gravity. Similarly, the minimum threshold height H2 represents a distance separating the reference Ref of the aircraft 1 and a point of the low plane PINF, according to gravity.

For example, the maximum threshold height H1 may be equal in absolute value to the distance dis1 separating the top 2 of the aircraft 1 and the reference Ref, plus a first margin marg1, i.e., H1=dis1+marg1. Similarly, the minimum threshold height H2 may be equal in absolute value to the distance dis2 separating the end 4 of a landing gear 3 and the reference Ref, plus a second margin marg2, i.e., H2=dis2+marg2.

Optionally, the maximum threshold height H1 and the minimum threshold height H2 are variable depending solely on a vertical speed of the aircraft 1. According to the preceding example, the first margin marg1 may be equal to a constant multiplied by the vertical speed VZ. Similarly, the second margin marg2 may be equal to a constant multiplied by the vertical speed VZ.

Alternatively, the maximum threshold height H1 and the minimum threshold height H2 are variable depending on one or more of the following parameters: a vertical speed VZ of the aircraft 1, a height of the aircraft 1 relative to the ground, a forward speed of the aircraft 1.

According to a first variant depicted in solid lines, the high plane PSUP and the low plane PINF are horizontal and positioned respectively at the maximum threshold height H1 and at the minimum threshold height H2 relative to the reference Ref. With reference to FIG. 5, the margins help ensure that the aircraft 1 remains between the low plane PINF and the high plane PSUP following a modification of its attitude, for example during roll.

According to a second variant, the high plane PSUP and the low plane PINF are parallel to a plane containing a landing area.

According to a third variant shown with dashed lines in FIG. 4, the high plane PSUP and the low plane PINF are parallel to a plane defined by a conventional longitudinal speed vector Vx and lateral speed vector Vy of the aircraft 1.

To this end, the filter 20 can communicate with a conventional longitudinal speed sensor and a conventional lateral speed sensor.

Irrespective of the variant, the method may include a step in which the filter 20 determines an obstacle height Hn of each obstacle point 75, relative to a reference plane PO passing through the reference Ref. For example, the reference plane PO can be a horizontal plane, a plane that coincides with the median plane, a plane parallel to the high plane PSUP.

The filter 20 then determines, by means of this obstacle height Hn, whether the obstacle point 75 is situated in the space between and inclusive of the high plane PSUP and the low plane PINF.

For example, the obstacle height Hn of an obstacle point 75 depends on the distance of the obstacle point 75 from the reference Ref and its angle of elevation alphan and its bearing angle p sin. Optionally, the obstacle height Hn of an obstacle point 75 is calculated using the following relation:

$$Hn = Dn * \sin(\text{alphan} + (\text{phi} * \sin(p\ \sin)) + \text{theta} * \cos(p\ \sin))$$

where "Hn" represents the obstacle height, "=" represents the equals sign, "*" represents the multiplication sign, "+" represents the addition sign, "sin" represents the sine function, "cos" represents the cosine function, "Dn" represents the distance of the point from the reference, obtained by means of the obstacle sensor, "alphan" represents the angle of elevation of the point, obtained by means of the obstacle sensor, "p sin" represents the bearing angle of the obstacle point, obtained by means of the obstacle sensor, "phi" represents the roll angle of the aircraft, "theta" represents the pitch angle of the aircraft.

In particular in the context of the first variant, if an obstacle point 75 has an obstacle height greater than or equal to the minimum threshold height H2 and less than or equal to the maximum threshold height H1, and considering that the minimum threshold height H2 has a negative sign and the maximum threshold height H1 has a positive sign, this obstacle point 75 is then considered to be a relevant point 80 by the filter 20.

Figure 6:
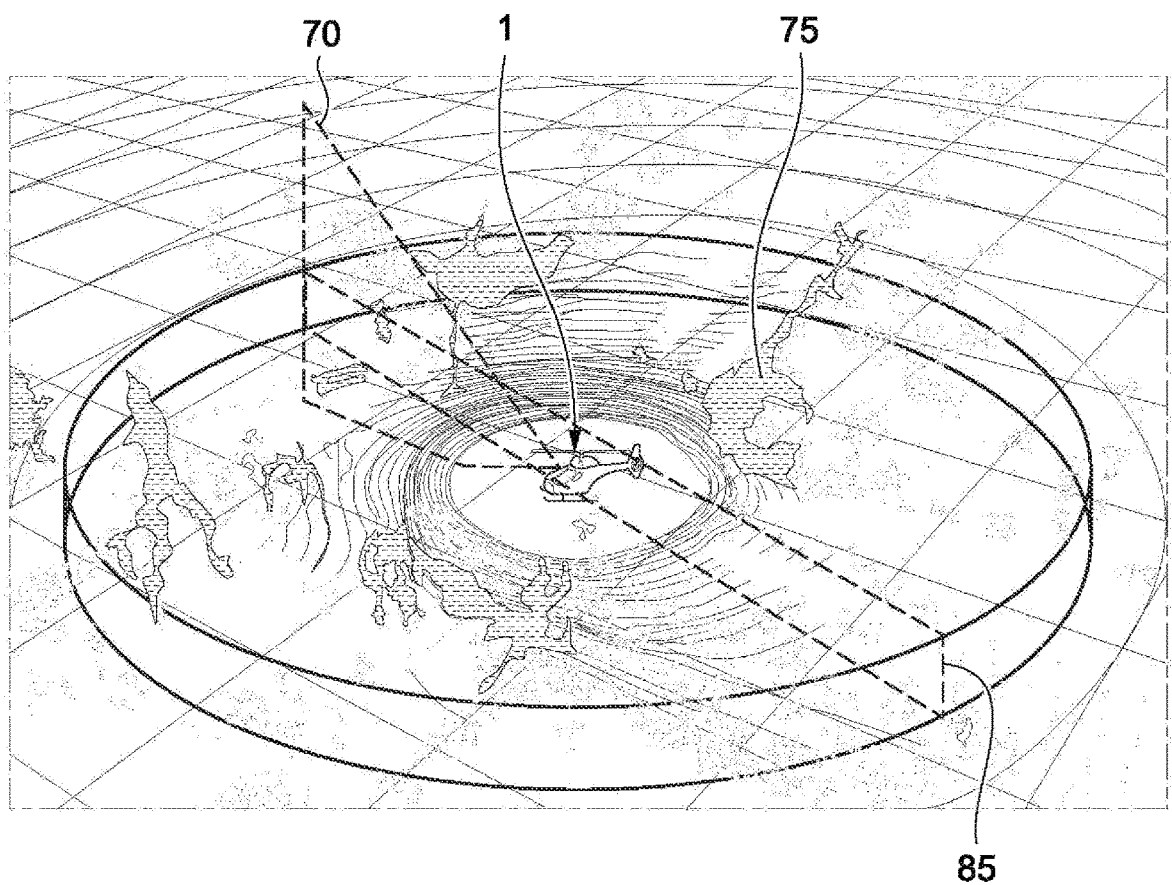
FIG. 6 is a schematic three-dimensional view showing the detection of obstacles.

FIG. 6 shows an aircraft 1 according to the disclosure applying the method of the disclosure.

During flight, the obstacle sensor 15 of the aircraft 1 examines the surrounding space 70. The filter 20 determines the relevant obstacle points. This FIG. 6 is a schematic illustration. Obstacles are shown schematically as hatched areas in order to illustrate the disclosure.

FIG. 7 shows a display that would display all the obstacle points 75 obtained at the flight point shown in FIG. 6. It can be seen that a pilot cannot make use of the displayed information.

FIG. 8 shows only the relevant points 80 displayed on a display 25, in a two-dimensional representation 28. The relevant points 80 are displayed by the display 25, by means of pixels, seen from above the aircraft 1 and through 360 degrees around a symbol 29 representing the aircraft 1.

The displayed information becomes intelligible and thus contributes to flight safety.

Optionally, the display 25 may perform a colorization step STP3.1. During this colorization step STP3.1, the display 25 assigns a color to each relevant point 80 depending on the nature of the material of the obstacle detected at this relevant point 80. Thus, a first relevant point 801 may have a first color COL1 whereas another relevant point 802 has another color COL2.

This nature may be evaluated in a conventional manner by the obstacle sensor 15. Thus, each relevant point 80 may have a first color when the obstacle 60 is detected as belonging to the mineral group, a second color when the obstacle 60 is detected as belonging to the metal group, a third color when the obstacle 60 is detected as belonging to the organic material group, and a fourth color when the obstacle 60 is detected as belonging to the group of elements diffused in the air.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure.

What is claimed is:

1. A method for detecting obstacles in the vicinity of an aircraft,
wherein the method includes the following steps:
examining a surrounding space by means of an obstacle sensor, the obstacle sensor generating positioning data relating to a plurality of obstacle points;
determining each obstacle point situated within a detection volume, each obstacle point situated within the detection volume being a relevant point, the detection volume being different from the examined surrounding space, each obstacle point situated outside this detection volume being an irrelevant point, the detection volume extending between, and inclusive of, a high plane and a low plane, the high plane and the low plane being situated vertically and respectively above and below the aircraft; and
displaying the relevant points on the display, no irrelevant point being displayed on the display.

2. The method according to claim 1,
wherein the surrounding space examined by the obstacle sensor comprises an examined volume that extends through 360 degrees about an axis of symmetry attached to the aircraft, the surrounding space extending in elevation in an angular field extending to either side of a median plane orthogonal to the axis of symmetry.

3. The method according to claim 2,
wherein the angular field has an angle of at least 40 degrees.

4. The method according to claim 2,
wherein the examined space includes each examined volume analyzed since a measurement time.

5. The method according to claim 1,
wherein the display step comprises a step of displaying the relevant points in a two-dimensional representation seen from above or below the aircraft and through 360 degrees around a symbol representing the aircraft.

6. The method according to claim 1,
wherein the detection volume is attached to the aircraft, the detection volume defining a volume in which an obstacle is likely to present a danger to the aircraft.

7. The method according to claim 1,
wherein the method includes a step of determining a maximum threshold height and a minimum threshold height, the maximum threshold height being a distance separating the high plane and a reference of the aircraft in the vertical direction, the minimum threshold height being a distance separating the reference and the low plane in the vertical direction.

8. The method according to claim 7,
wherein the method comprises determining an obstacle height of each obstacle point with respect to a reference plane passing through the reference, each relevant point having, relative to the reference plane, an obstacle height placing it between the high plane and the low plane.

9. The method according to claim 8,
wherein the obstacle height of an obstacle point depends on the distance of the obstacle point from the reference and an angle of elevation of the obstacle point relative to the reference and a bearing angle of the obstacle point relative to the reference.

10. The method according to claim 8,
wherein the obstacle height of an obstacle point is calculated using the following relation:

$$Hn=Dn*\sin(\text{alpha}n+(\text{phi}*\sin(p\ \sin))+\text{theta}*\cos(p\ \sin))$$

where "Hn" represents the obstacle height, "=" represents the equals sign, "*" represents the multiplication sign, "+" represents the addition sign, "sin" represents the sine function, "cos" represents the cosine function, "Dn" represents the distance of the obstacle point from the reference, obtained by means of the obstacle sensor, "alphan" represents the angle of elevation of the obstacle point, obtained by means of the obstacle sensor, "p sin" represents the bearing angle of the obstacle point, obtained by means of the obstacle sensor, "phi" represents a roll angle of the aircraft, "theta" represents a pitch angle of the aircraft.

11. The method according to claim 7,
wherein the maximum threshold height is equal in absolute value to the distance separating a top of the aircraft from the reference plus a first margin, and the minimum threshold height is equal in absolute value to a distance of an end of a landing gear from the reference plus a second margin.

12. The method according to claim 7,
wherein the maximum threshold height and the minimum threshold height are variable depending on at least one of the following parameters: a vertical speed of the aircraft, a height of the aircraft relative to the ground, a forward speed of the aircraft.

13. The method according to claim 7,
wherein the high plane and the low plane are horizontal.

14. The method according to claim 7,
wherein the high plane and the low plane are parallel to a plane defined by a longitudinal speed vector and a lateral speed vector of the aircraft.

15. The method according to claim 1,
wherein the method includes a step of colorizing each relevant point depending on the nature of the material of an obstacle detected at this relevant point, this nature possibly relating to the mineral group or the metal group or the organic material group or the group of elements diffused in the air.

16. An aircraft provided with an obstacle detection system, the obstacle detection system comprising an obstacle sensor and a display,
wherein the obstacle detection system implements the method according to claim 1, the obstacle detection system having a filter configured to determine, from among the obstacle points each relevant point situated within a predetermined detection volume, the detection volume being different from the surrounding space, the display being configured to display the relevant points.

17. The aircraft according to claim 16,
wherein the display is a two-dimensional display.

18. The aircraft according to claim 16,
wherein the aircraft comprises a measurement system measuring a roll angle and a pitch angle of the aircraft, the filter cooperating with the measurement system.

19. A method for detecting obstacles in the vicinity of an aircraft,
wherein the method comprises:
examining a surrounding space by an obstacle sensor, the obstacle sensor generating positioning data relating to a plurality of obstacle points;
determining each obstacle point situated within a detection volume, each obstacle point situated within the detection volume being a relevant point, the detection volume being different from the examined surrounding space, each obstacle point situated outside the detection volume being an irrelevant point, the detection volume extending between, and inclusive of, a determined high plane and a determined low plane, the high plane and the low plane disposed vertically and respectively above and below the aircraft; and
displaying the relevant points on the display, no irrelevant point being displayed on the display.

20. The method according to claim 19,
wherein the surrounding space examined by the obstacle sensor comprises an examined volume that extends through 360 degrees about an axis of symmetry attached to the aircraft, the surrounding space extending in elevation in an angular field extending to either side of a median plane orthogonal to the axis of symmetry.

* * * * *